United States Patent
Jiang et al.

(10) Patent No.: US 10,700,956 B2
(45) Date of Patent: Jun. 30, 2020

(54) AP TRACKING SNIFFER AWARE WI-FI NETWORK

(71) Applicant: Cisco Technology, Inc., San Jose, CA (US)

(72) Inventors: Jie Jiang, San Jose, CA (US); Vishal S. Desai, San Jose, CA (US); Kasi Nalamalapu, Cupertino, CA (US); Manoj Gupta, Santa Clarita, CA (US); Ramadhasan Thangachamy, Sunnyvale, CA (US); Venkatesh Kanagasabapathy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 15/875,902

(22) Filed: Jan. 19, 2018

(65) Prior Publication Data
US 2019/0230019 A1 Jul. 25, 2019

(51) Int. Cl.
*G06F 15/173* (2006.01)
*H04L 12/26* (2006.01)

(52) U.S. Cl.
CPC ............. *H04L 43/12* (2013.01); *H04L 43/04* (2013.01); *H04L 43/16* (2013.01); *H04L 43/50* (2013.01); *H04L 43/0876* (2013.01); *H04L 43/18* (2013.01)

(58) Field of Classification Search
CPC .. H04W 84/18; H04L 12/1868; H04L 12/189; H04L 1/1887; H04L 2001/0093
See application file for complete search history.

(56) References Cited

U.S. PATENT DOCUMENTS

| | | | |
|---|---|---|---|
| 6,735,629 B1 | 5/2004 | Cafarelli, III et al. | |
| 7,370,362 B2 * | 5/2008 | Olson | H04L 63/1433 726/25 |
| 10,129,887 B2 * | 11/2018 | Pabla | H04B 7/0697 |
| 2004/0218602 A1 | 11/2004 | Hrastar | |
| 2006/0025178 A1 * | 2/2006 | Tao | H04B 7/0617 455/562.1 |
| 2006/0193284 A1 | 8/2006 | Stieglitz et al. | |
| 2007/0076590 A1 | 4/2007 | Galpin et al. | |
| 2009/0022121 A1 | 1/2009 | Budampati et al. | |
| 2009/0274060 A1 | 11/2009 | Taylor | |
| 2017/0324439 A1 | 11/2017 | Desai et al. | |
| 2017/0325104 A1 | 11/2017 | Desai et al. | |
| 2019/0052995 A1 * | 2/2019 | Agrawal | H04B 17/30 |

OTHER PUBLICATIONS

Cisco, "Radio Resource Management White Paper-Chapter: Flexible Radio Assignment (FRA) and Redundant Radios," Updated Jun. 24, 2016, 21 pages [Accessed Online Jan. 19, 2018] https://www.cisco.com/c/en/us/td/docs/wireless/controller/technotes/8-3/b_RRM_White_Paper/b_RRM_White_Paper_chapter_01000.html.

* cited by examiner

*Primary Examiner* — S M A Rahman
(74) *Attorney, Agent, or Firm* — Patterson + Sheridan, LLP (57) ABSTRACT

An apparatus, computer program product, and method relating to identifying and configuring an access point (AP) as a network sniffer. A network controller identifies a plurality of sniffer targets for which at least one of a plurality of sniffer candidate access points an act as a network sniffer. The controller receives a desired sniffer target. The controller selects a first AP, of the plurality of sniffer candidate APs, for use as a network sniffer, based on the identified plurality of sniffer targets and the desired sniffer target. The controller configures a radio in the first AP as a network sniffer to monitor network traffic related to the desired sniffer target.

20 Claims, 10 Drawing Sheets

FIG. 9B

AP TRACKING SNIFFER AWARE WI-FI NETWORK

BACKGROUND

High-density wireless deployments have become more common in recent years. With the proliferation of these deployments, monitoring network traffic has become increasingly important to, for example, troubleshoot and avoid network problems, monitor network usage, and monitor network performance. A sniffer device can be used to monitor network traffic. For example, network technicians can visit a client site with dedicated sniffer devices to monitor network traffic and troubleshoot the network. But this is expensive, inefficient, and inflexible, requiring technicians to visit client sites in person and to set up dedicated sniffing devices.

SUMMARY

An embodiment described herein is A network controller that includes a processor and a memory containing a program that, when executed on the processor, performs an operation. The operation includes identifying a plurality of sniffer targets for which at least one of a plurality of sniffer candidate access points (APs) can act as a network sniffer. The operation further includes receiving a desired sniffer target. The operation further includes selecting a first AP, of the plurality of sniffer candidate APs, for use as a network sniffer, based on the identified plurality of sniffer targets and the desired sniffer target. And the operation further includes configuring a radio in the first AP as a network sniffer to monitor network traffic related to the desired sniffer target A further embodiment described herein is a computer program product that includes a non-transitory computer-readable storage medium having computer readable program code embodied on it. The computer readable program code includes computer readable program code configured to identify a plurality of sniffer targets for which at least one of a plurality of sniffer candidate access points (APs) can act as a network sniffer. The computer readable program code is further configured to receive a desired sniffer target. The computer readable program code is further configured to select a first AP, of the plurality of sniffer candidate APs, for use as a network sniffer, based on the identified plurality of sniffer targets and the desired sniffer target. And the computer readable program code is further configured to configure a radio in the first AP as a network sniffer to monitor network traffic related to the desired sniffer target.

A further embodiment described herein is a computer implemented method for identifying and configuring an AP as a network sniffer. The method includes identifying a plurality of sniffer targets for which at least one of a plurality of sniffer candidate access points (APs) can act as a network sniffer. The method further includes receiving a desired sniffer target. The method further includes selecting a first AP, of the plurality of sniffer candidate APs, for use as a network sniffer, based on the identified plurality of sniffer targets and the desired sniffer target. And the method further includes configuring a radio in the first AP as a network sniffer to monitor network traffic related to the desired sniffer target

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Instead of using on-site technicians and dedicated hardware, it is possible to monitor network traffic using the existing Access Points (APs) in the wireless network as sniffers for other APs and user devices. These sniffers can be used to monitor network traffic to and from a particular user device, or to and from a particular AP or particular radio within an AP. A system can also track physical movement of a user device through a network and between APs, and select different existing APs to act as sniffers as the user device moves.

In one embodiment, when an AP is used as a sniffer, however, the radio being used for sniffing cannot be used to service user devices. One solution is to setup dedicated APs to use as permanent sniffers. This allows consistent monitoring of the network, but using a dedicated AP can be expensive, and many wireless deployments do not have spare APs available to serve as permanent sniffers. Setting up dedicated APs as sniffers can require expensive, and inefficient, changes to the backend infrastructure of a network deployment. Further, many network troubleshooting scenarios require on-demand sniffing capabilities. Dedicated APs may not be in position to monitor the desired network traffic because, for example, the sniffing target may not be within the coverage area of a dedicated AP.

A different solution is to allow a user to manually choose which APs to use as sniffers. But this requires an operator to manually select an appropriate AP, which can be expensive, slow, and inefficient. Further, the selected AP is then unavailable for client service, potentially creating coverage holes and impacting client network service.

Another solution is to use as a sniffer an AP that includes a radio that is temporarily redundant and not currently necessary to service user devices. To do this, one can automatically identify available APs, select a subset of the available APs suitable for use as sniffers, and then select an AP to operate as a sniffer for the desired network traffic. In one embodiment, available APs can be identified through Flexible Radio Assignment (FRA) functionality, or other suitable methods. Algorithms can then be used to analyze which of the available APs are suitable for use as sniffers, and which AP should be configured as a sniffer. The sniffer can further use security keys to decrypt the network traffic being monitored.

Figure 1:
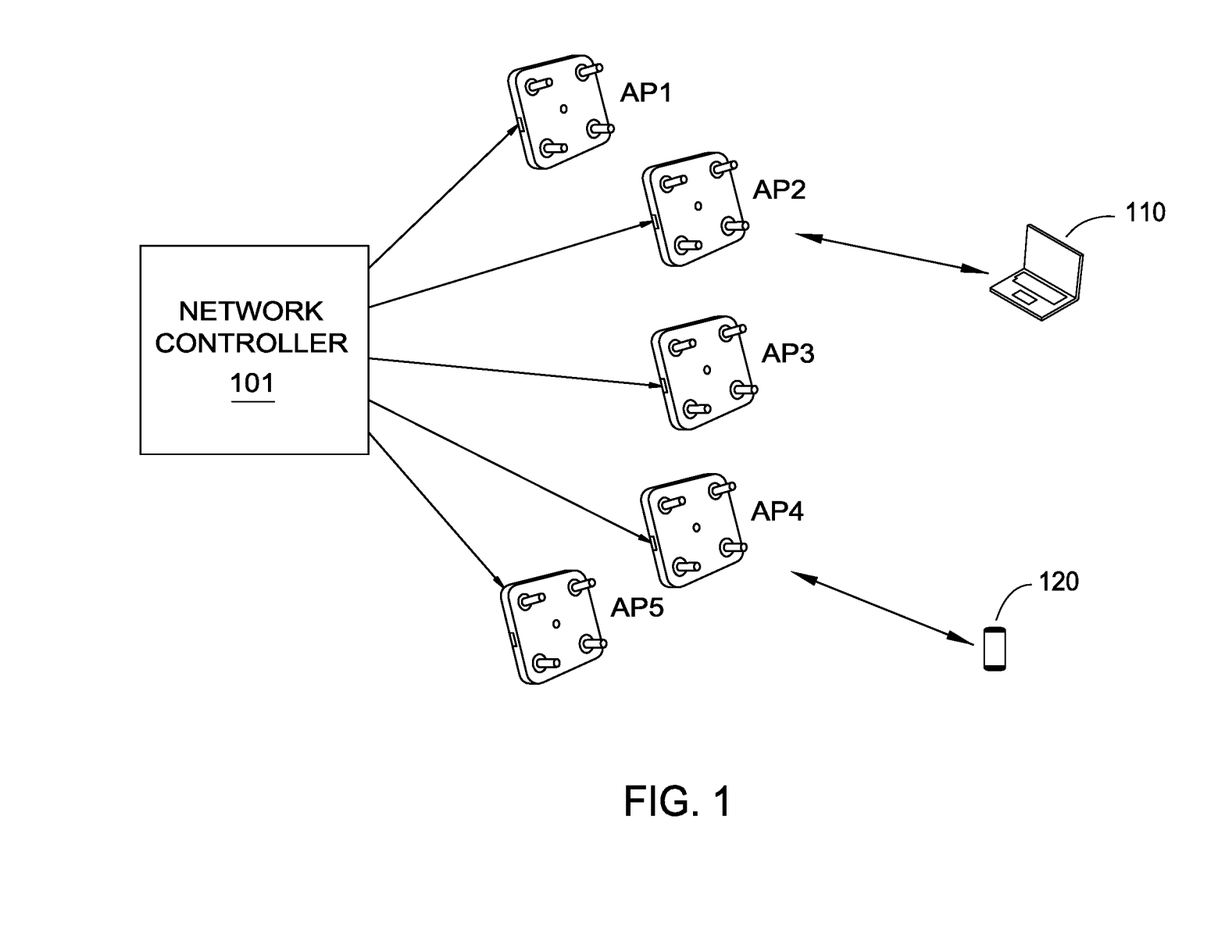
FIG. 1 illustrates a network controller controlling multiple Access Points (APs) in a network, according an embodiment.

FIG. 1 illustrates a network controller controlling a plurality of APs in a network, according to one embodiment herein. In FIG. 1, the network controller 101 controls a plurality of APs, including AP1 to AP5. In one embodiment, each AP includes two radios, where the first radio is a dedicated 5 GHz radio that transmits signals in the 5 GHz frequency band and the second radio is a XOR radio that can dynamically switch between the 2.4 GHz and 5 GHz frequency bands. That is, the second radio can transmit signals in either the 2.4 GHz frequency band or the 5 GHz frequency band. The two radios in an AP can be active simultaneously on the same frequency band or on different frequency bands. For example, the XOR radio and the dedicated 5 GHz radio in an AP can simultaneously transmit signals in the 5 GHz frequency band by using different channels of the 5 GHz frequency band. In one embodiment, the network controller 101 can be an AP, e.g., a master AP that can control other APs. In another embodiment, the network controller 101 can be a separate computing device. In another embodiment, the network controller 101 can be a device in a cloud computing environment.

The network can further include user devices connected to the various APs. For example, a user device 110 in FIG. 1 is connected to AP2 as part of a wireless network. The user device 110 can be a laptop computer, a desktop computer, a phone, a tablet, or any other device capable of connecting to the wireless network. As another example, a user device 120 can be connected to AP4 as part of the wireless network. Just like user device 110, user device 120 can be a laptop computer, a desktop computer, a phone, a tablet, or any other device capable of connecting to the wireless network.

In one embodiment, the APs can offer various services based on the network deployment and user device density. For example, the AP1-AP5 have two operation modes, i.e., a local working mode and a non-client serving role. The operation modes apply to both radios of an AP. Also, the radios in AP1-AP5 have two radio roles, i.e., a dedicated radio role and an XOR radio role. In one embodiment, when operating in the local working mode, the dedicated 5 GHz radio transmits signals in the 5 GHz frequency band and the XOR radio transmits signals in either the 2.4 GHz frequency band or the 5 GHz frequency band. In the non-client serving role, however, the dedicated 5 GHz radio and the XOR radio do not transmit signals in either the 5 GHz or the 2.4 GHz frequency bands. Also, in one embodiment, in the non-client serving role, the radios consume lower power than in the local working mode. In another embodiment, in the non-client serving role, the radios are passive monitors that can receive signals transmitted on the 5 GHz or the 2.4 GHz frequency bands but do not transmit signals.

In one embodiment, the network controller 101 determines whether a radio in an AP is redundant. This can be done using Flexible Radio Assignment (FRA) functionality, which is discussed in more detail in U.S. patent application Ser. No. 15/475,577. That application's discussion of FRA, and associated network architecture and algorithms, is hereby incorporated by reference.

That is, the network controller 101 determines whether coverage area of the radio is already covered sufficiently (fully or almost fully) by at least one radio in a neighboring AP. For example, if AP1's XOR radio transmits signals using a channel of the 2.4 GHz frequency band and if AP2 and AP3's XOR radios also transmit signals using the same channel of the 2.4 GHz frequency band which cover the same area as AP1's XOR radio, then AP1's XOR radio is redundant. In this situation, AP1's redundant XOR radio may cause co-channel interference with AP2 and AP3's XOR radios.

If the network controller 101 determines that a radio in an AP is redundant in a frequency band, the network controller 101 manages the redundant radio to mitigate co-channel interference in the frequency band, e.g., the network controller 101 prohibits the redundant radio from transmitting signals in the frequency band. In one embodiment, the network controller 101 instructs AP1's XOR radio to switch to the 5 GHz frequency band. That is, the network controller 101 switches AP1's XOR radio to transmit signals in the 5 GHz frequency band, so that AP1's XOR radio does not transmit signals in the 2.4 GHz frequency band. Thus, the XOR radio of AP1 not only does not cause co-channel interference in the 2.4 GHz frequency band but also increases capacity in the 5 GHz frequency band. In another embodiment, the network controller 101 instructs AP1's XOR radio to change from the local working mode to the non-client serving role so that AP1's XOR radio does not transmit signals in the 2.4 GHz frequency band and does not cause co-channel interference in that band. In other embodiments, based on the network deployment and user preference, the network controller 101 instructs AP1's XOR radio to change from the local working mode to provide other services such as acting as a wireless sensor or network traffic sniffer.

FIG. 1 illustrates only one embodiment herein. In other embodiments, the network controller 101 may control a different number of APs. Moreover, the APs may include a different number of radios. For example, the APs may include a dedicated 5 GHz radio, a dedicated 2.4 GHz radio, and a XOR radio. In other embodiments, the radios of the APs may transmit signals in frequency bands different from the 5 GHz frequency band and the 2.4 GHz frequency band, as understood by an ordinary person in the art.

Figure 2:
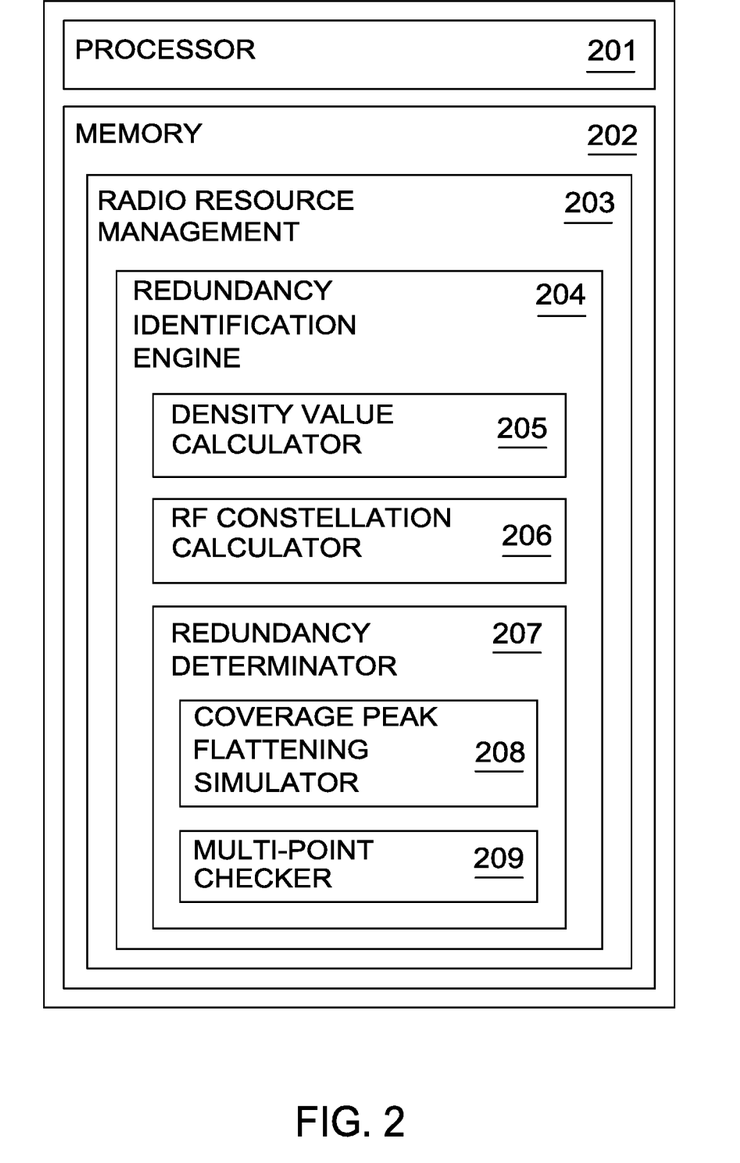
FIG. 2 illustrates a network controller, according to an embodiment.

FIG. 2 illustrates the network controller 101, according to one embodiment herein. The network controller 101 includes a processor 201 and a memory 202. The processor 201 may be any computer processor capable of performing the functions described herein. Although memory 202 is shown as a single entity, memory 202 may include one or more memory devices having blocks of memory associated with physical addresses, such as random access memory (RAM), read only memory (ROM), flash memory or other types of volatile and/or non-volatile memory.

The memory 202 includes a radio resource management (RRM) component 203. The RRM component 203 provides a system level management of co-channel interference, radio resources, and other radio transmission characteristics in the network. The RRM component 203 includes core algorithms for controlling parameters such as transmit power, user allocation, beamforming, data rates, handover criteria, modulation scheme, error coding scheme, etc. The RRM component 203 aims to utilize the radio-frequency resources and radio network infrastructure in an efficient way.

In one embodiment, the RRM component 203 receives inter-radio measurement data reported from the APs controlled by the network controller 101. The inter-radio measurement data may include but is not limited to the channel frequency between two radios of different APs, transmit power, antenna information and the received signal strength indicator (RSSI) or path loss between two radios of different APs.

In one embodiment, the RRM component 203 performs the inter-radio measurement based on a neighbor discovery protocol (NDP). By using NDP, each radio in each AP sends a broadcast message to all other radios in all other APs on all channels so that all other radios operating on different channels can receive the broadcast message. The broadcast message may be a neighbor discovery packet with a pre-defined packet format. When a radio in an AP receives the neighbor discovery packet, it uses the neighbor discovery packet to obtain the inter-radio measurement data, and forwards the neighbor discovery packet and the inter-radio measurement data to the RRM component 203. Based on the received neighbor discovery packet and the inter-radio measurement data, the RRM component 203 can understand how every radio using a channel hears every other radio using the same channel and how every AP relates to other APs in the network controlled by the network controller 101.

The RRM component 203 includes a redundancy identification engine (RIE) 204. Based on the measurement data received by the RRM component 203, the RIE 204 can identify redundant radios in APs in a frequency band. The RIE 204 includes a density value calculator 205, a radio frequency (RF) constellation calculator 206 and a redundancy determinator 207. The density value calculator 205 identifies candidate APs for redundancy determination, the RF constellation calculator 206 calculates relative locations of neighboring APs, and the redundancy determinator 207 determines whether a radio in an AP is redundant.

The redundancy determinator 207 includes a coverage peak flattening simulator 208 and a multi-point checker 209. The coverage peak flattening simulator 208 models a total coverage area covered by radios in a plurality of APs and determines whether multiple radios are covering an overlapping area of the total coverage area. The coverage peak flattening simulator 208 also predicts an impact to the total coverage area if a radio in a selected AP does not transmit signals in a frequency band.

After the coverage peak flattening simulator 208 determines that the impact to total coverage area is acceptable if the radio in the selected AP does not transmit signals in a frequency band, the multi-point checker 209 further checks whether the radio is contributing to coverage areas of one or more radios in neighboring APs that are already determined as redundant. For example, if a radio in a neighboring AP does not transmit signals in the frequency band because the radio in the neighboring AP was previously identified by the RIE 204 as redundant, the multi-point checker 209 checks whether the radio in the selected AP is transmitting signals in the original coverage area (the coverage area before the redundant radio is prohibited from transmitting signals) of the redundant radio in the neighboring AP. If the coverage area of the radio in the selected AP does not overlap with the coverage areas of one or more radios in neighboring APs that are already determined as redundant, the multi-point checker 209 further ensures that the coverage area of the radio in the selected AP is sufficiently covered by one or more radios in neighboring APs that are transmitting signals in the frequency band. Algorithms implemented by the coverage peak flattening simulator 208 and the multi-point checker 209 are discussed in more detail in U.S. patent application Ser. No. 15/475,577, and are hereby incorporated by reference.

Figure 3:
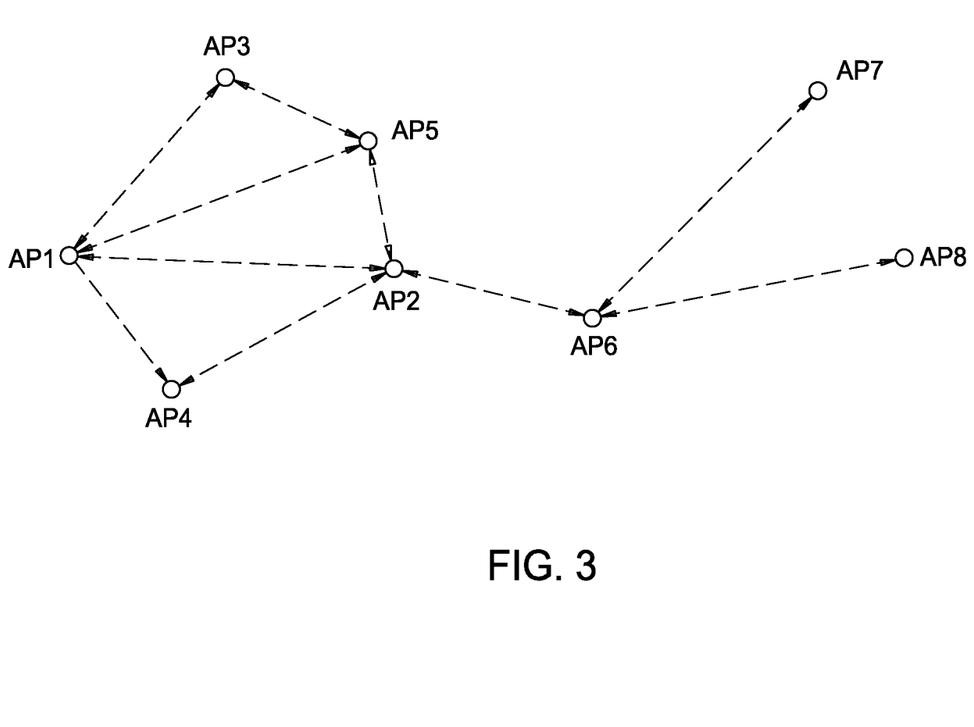
FIG. 3 illustrates a neighborhood including multiple APs, according to an embodiment.

FIG. 3 illustrates a neighborhood including multiple APs, according to one embodiment herein. The dotted lines and arrows between APs represent neighbor relationships. For example, AP3 is a TX neighbor of AP1, meaning at least one of AP1s radios can reach AP3. This is illustrated with the dotted line between AP1 and AP3 and the arrow pointing from AP1 to AP3. AP3 is also an RX neighbor of AP1, meaning at least one of AP3's radios can reach AP1. This is illustrated with the arrow pointing from AP3 to AP1.

As illustrated in FIG. 3, AP1 has four neighbors: AP3, AP5, AP2, and AP4. AP2 has three neighbors: AP5, AP4, and AP6. AP3 has two neighbors: AP1 and AP5; AP4 has two neighbors: AP1 and AP2; and AP5 has three neighbors, AP3, AP2, and AP1. Each of these are both TX and RX neighbors, as illustrated by the arrows in FIG. 3.

Figure 4A:
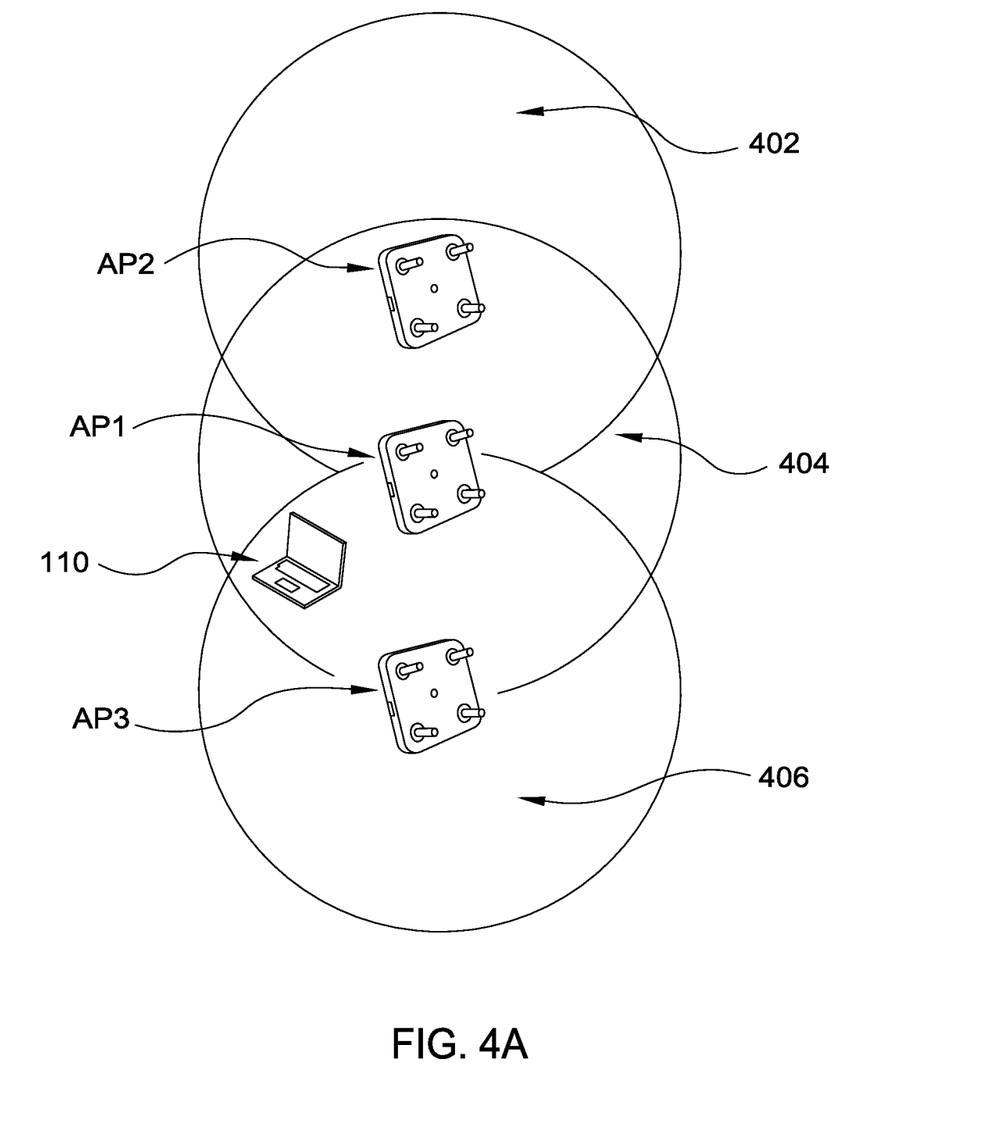
FIGS. 4A-B illustrate a user device in a neighborhood including multiple APs, according to an embodiment.
Figure 4B:
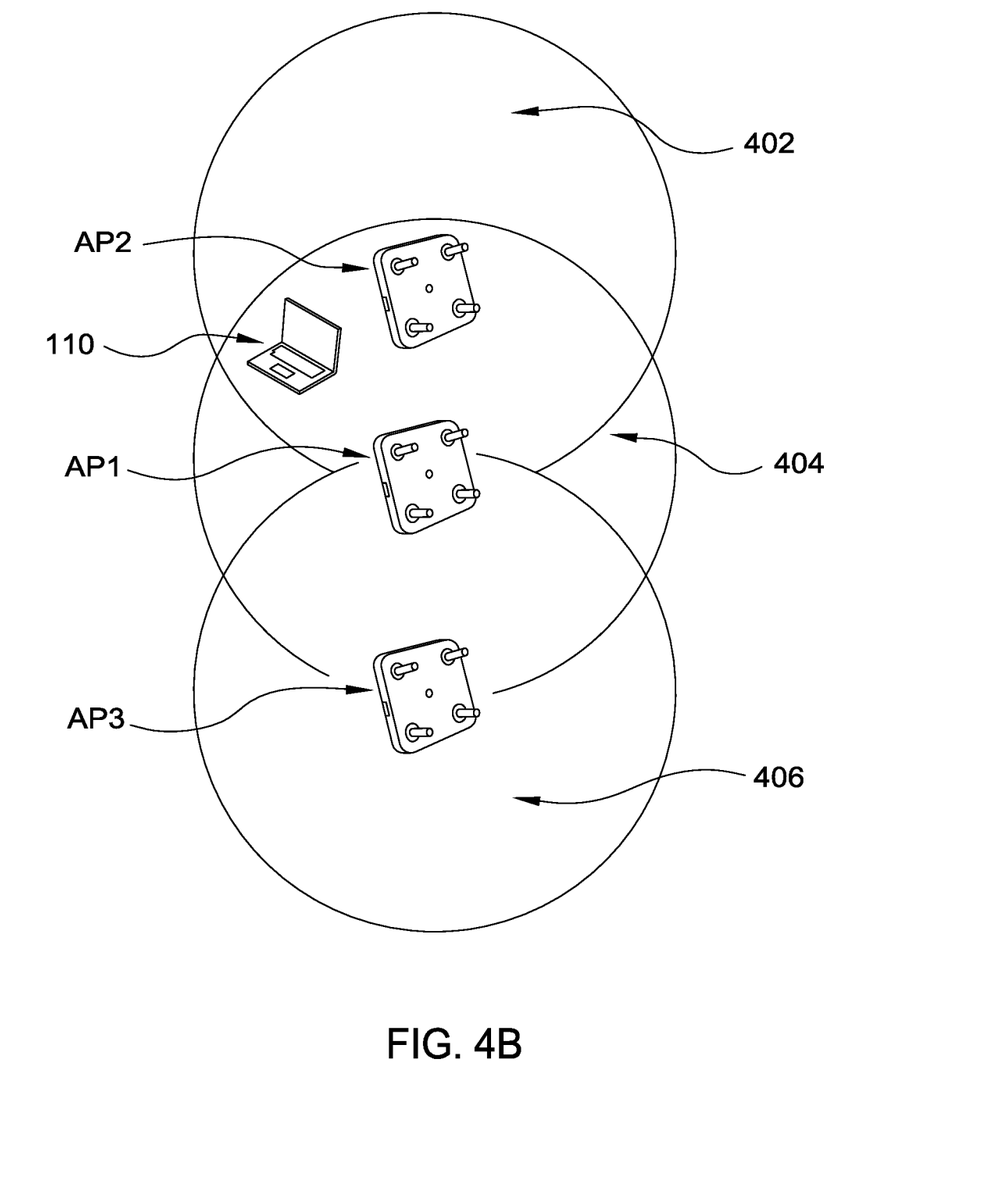

FIGS. 4A-B illustrate a user device in a neighborhood including multiple APs. The circle 402 represents the coverage area for at least one of the radios within AP2. AP2 is capable of servicing a device within its coverage area. The circle 404, similarly, represents the coverage area for at least one of the radios within AP1. AP1 is capable of servicing a device within its coverage area. The circle 406 represents the coverage area for at least one of the radios within AP3. AP3 is capable of servicing a device within its coverage area.

As illustrated in FIGS. 4A and 4B, the coverage areas 402, 404, and 406 overlap. In FIG. 4A, for example, the user device 110 is within the coverage area 404 of AP1 and the coverage area 406 of AP3. This allows either AP1 or AP3 to service the user device 110 as part of the wireless network, and potentially allows the other AP to act as a sniffer for network traffic to and from the user device 110. For example, the user device 110 could be connected to AP3 for network transmission and reception. AP1 could then act as a sniffer, monitoring network traffic between the user device 110 and AP3.

In FIG. 4B, the user device 110 has moved. The user device 110 is now within the coverage areas of AP1 and AP2, but not AP3. As described in more detail in subsequent figures, this means that the AP used as a sniffer must change, if the user still wishes to monitor network traffic to and from the user device 110. For example, the user device 110 could now be connected to AP1 for network transmission and reception. AP1 could be de-provisioned as a sniffer, and AP2 could then be configured as a sniffer instead, monitoring network traffic between the user device 110 and AP1.

Figure 5:
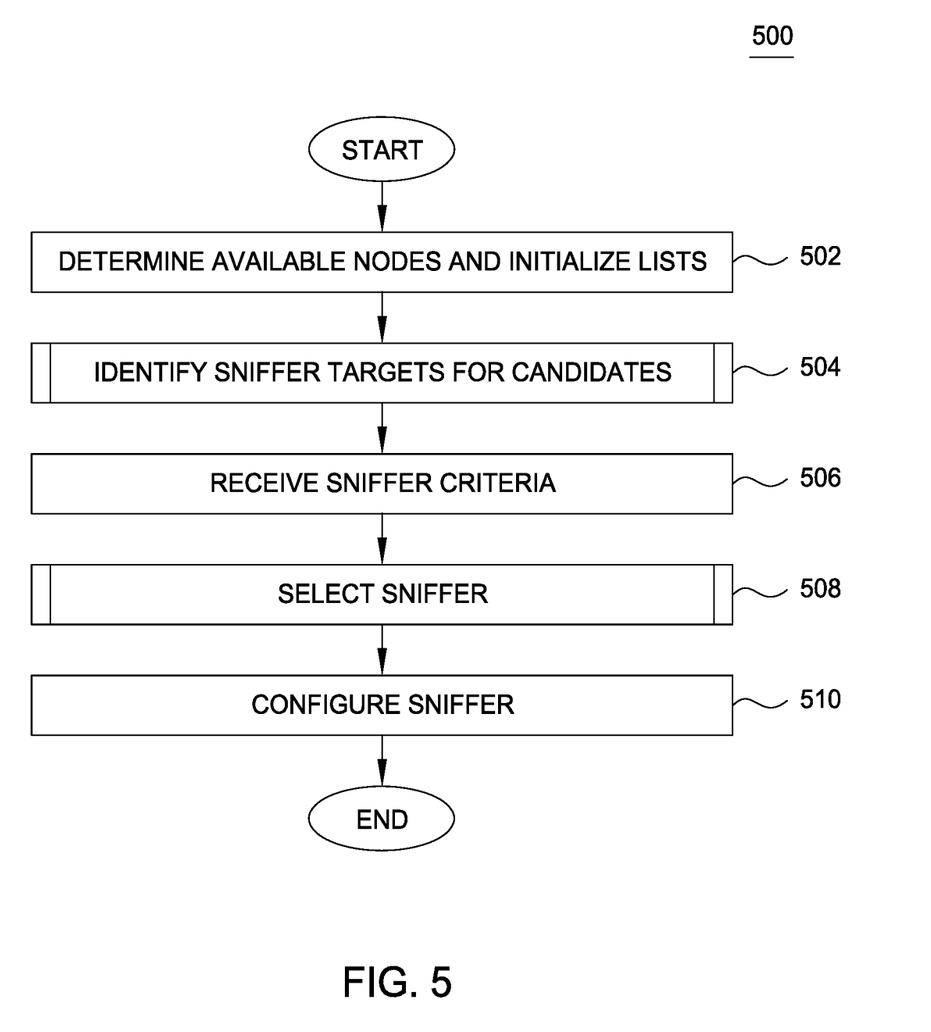
FIG. 5 is a flowchart for selecting and configuring a sniffer in a network, according to an embodiment.

FIG. 5 is a flowchart for selecting and configuring a sniffer in a network, according to an embodiment. Deployment of an AP as a sniffer can involve two phases: (1) periodic, proactive, selection of candidate radios and (2) on-demand selection of a sniffer radio from the list of candidates, based on the desired target and other criteria. In an embodiment, phase one can be performed periodically, for example every 10 minutes. Phase two then uses the list of candidate radios generated in phase one, selects an appropriate radio, and configures the radio for use as a sniffer.

One embodiment of this process is illustrated in FIG. 5. This process can be undertaken by any suitable device in the system, including network controller 101 illustrated in FIG. 1. As discussed above, the network controller 101 can be an AP, e.g., a master AP that can control other APs. In another embodiment, the network controller 101 can be a separate computing device. In another embodiment, the network controller 101 can be a device in a cloud computing environment.

At step 502, the network controller 101 determines available nodes and initializes lists. For example, the controller initializes and maintains two buckets of APs: Redundant_Radios and Sniffer_Candidates. Both buckets are initially empty. Redundant_Radios is initialized with a list of available AP radios. There are various ways to identify the available AP radios in a given network. In one embodiment, the network controller 101 chooses the radios that have no load/clients (or the smallest load) as the Redundant_Radios, or radios that are covered by multiple neighbors as the Redundant_Radios, or a combination of both. Alternatively, the Redundant_Radios can be identified using an FRA algorithm to determine redundant APs in the network as discussed in FIG. 2, above. For example, an FRA algorithm can be used to identify APs that include at least one radio that is redundant, meaning the radio is not necessary for client service. The Redundant_Radios bucket can be populated with the radios in these APs.

At step 504, network controller 101 identifies possible sniffer targets for the sniffer candidate APs. For example, the network controller 101 populates the Sniffer_Candidates bucket with candidate radios, information about which target radios can be serviced by each of the candidate radios, and related information. In an embodiment, the related information can include a received signal strength indicator (RSSI) between the candidate and the target. RSSI provides an indication of the signal strength between the sniffer candidate and the potential target. Step 504 is discussed in more detail with regard to FIGS. 7-9.

At step 506, the network controller 101 receives sniffing criteria. This criteria can include the target which can be, for example, a particular AP or a particular user device. The target can be manually entered by a user, for example by entering a MAC address for the target. The target can also be determined automatically by the system. For example, if a network problem related to a user device is reported or identified, the network controller 101 can identify the AP nearest to the client and set that AP as the target.

The criteria can also include information about whether the sniffer should monitor all traffic to or from the target, or a subset of such traffic. For example, a sniffer can be used to monitor all traffic to or from a particular AP. Or, the sniffer can monitor a subset of this traffic—for example, only upload traffic from user devices to the target AP, only download traffic from the target AP to user devices, only traffic from the target AP to a particular user device or a particular radio, only traffic using a particular wireless protocol (e.g., a particular 802.11 classification), only a particular type of packet, only particular network frames or types of network frames, or any other subset of the traffic. Alternatively, the sniffer can be used to monitor all traffic to or from a particular user device, or a subset of this traffic—for example, only upload traffic from the user device to any AP, only download traffic from any AP to the user device, only traffic from the target user device to a particular AP or a particular radio, only traffic using a particular wireless protocol (e.g., a particular 802.11 classification), only a particular type of packet, only particular network frames or types of network frames, or any other subset of the traffic. The network controller 101 can use this criteria to select an appropriate radio for use as a sniffer. The criteria can be input directly by a user using, for example, a user interface. The criteria can also be generated as part of a troubleshooting process initiated by a user, or as part of an automated troubleshooting process used to detect and correct flaws in the network.

At step 508, the network controller 101 selects a radio from the bucket of Sniffer_Candidates to use as a sniffer. In an embodiment, this selection can be based on the sniffer criterial received as part of step 506. This step is discussed in more detail with regard to FIGS. 9A and 9b.

At step 510, the network controller 101 configures the chosen radio to act as a sniffer. In an embodiment, this includes configuring the chosen sniffer radio with the target radio's channel and width. This can further include configuring the sniffer radio to filter the desired traffic. For example, if the sniffer criteria includes only upload traffic, the chosen sniffer can be configured to filter the network traffic and only monitor upload traffic. This can be done for any suitable filter criteria: upload/download, a particular AP or radio, a particular user device, or a particular network classification.

In an embodiment, step 510 can include supplying one or more security keys to the sniffer AP to allow the sniffer AP to decrypt the monitored network data. In many wireless systems, traffic between an AP and a user device is encrypted, such that the traffic can only be decrypted using security keys. This encryption can be based on Wired Equivalent Privacy (WEP), Wi-Fi Protected Access (WPA), or any other suitable security standard. The security keys are typically only available to the user device and the AP providing network access to the user device. A sniffer monitoring traffic between an AP and a user device cannot access the security keys, and cannot decrypt the traffic between the AP and the user device. This provides network security and prevents a nefarious party from monitoring traffic and accessing potentially sensitive data.

But in an embodiment, a network controller, like the network controller 101 illustrated in FIG. 1, has access to the security keys for each AP and user device that network controller is serving. As part of the configuration process of step 510, the network controller 101 can provide the security keys to the sniffer AP, allowing the sniffer AP to decrypt the network traffic so that it can be used for troubleshooting.

For example, in the network illustrated in FIG. 1, the user device 110 could be connected to AP2. A radio in AP3 could be chosen as a sniffer according to the steps illustrated in FIG. 5, and AP3 could be configured in step 510 for use as a sniffer to monitor the network traffic between the user device 110 and AP2. As part of step 510, the network controller 101 can provide AP3 the security keys associated with traffic between AP2 and the user device 110, so that AP3 can decrypt the network traffic it monitors. This allows monitoring of network traffic between the user device 110 and AP2, without compromising the security of the system or allowing a nefarious party to access sensitive data.

Figure 6:
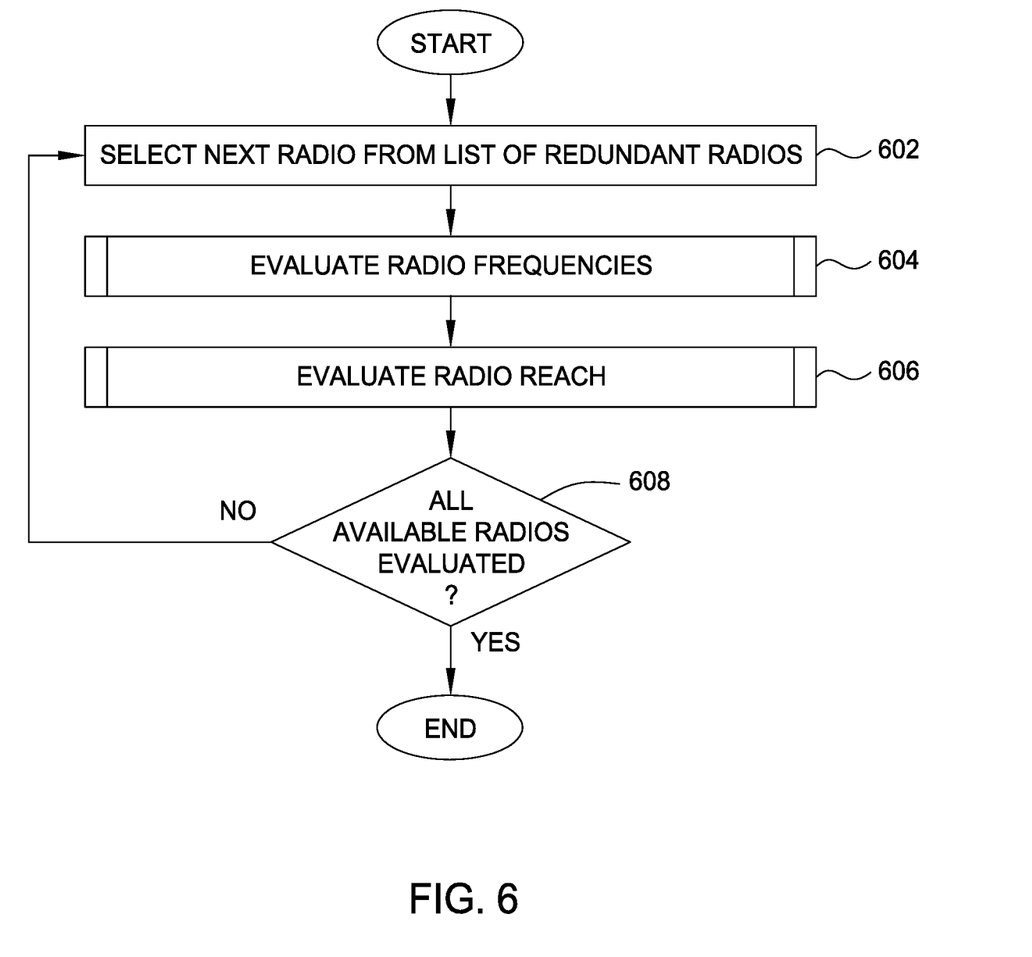
FIG. 6 is a flowchart for identifying possible sniffer targets for the sniffer candidate APs, according to an embodiment.

FIG. 6 is a flowchart for identifying possible sniffer targets for the sniffer candidate APs, according to an embodiment. This corresponds to step 504 in FIG. 5. At step 602, the network controller 101 selects the next candidate radio from the redundant radios (e.g., the Redundant_Radio bucket populated at step 502 of FIG. 5). At step 604, the network controller 101 evaluates the frequencies used by radios neighboring the candidate radio. This is discussed in more detail with regard to FIG. 7.

At step 606, the network controller 101 continues to evaluate the chosen candidate radio, now evaluating the sniffer reach from the candidate to its neighbors. The network controller 101 adds to the Sniffer_Candidates bucket entries correlating the candidate radio with any neighbors for which it is a suitable sniffer. This is discussed in more detail with regard to FIG. 8. At step 608, the network controller 101 determines whether all the radios in the Redundant_Radios bucket have been evaluated. If so, the process concludes. If not, the network controller 101 returns to step 602 and evaluates the next candidate radio.

Figure 7:
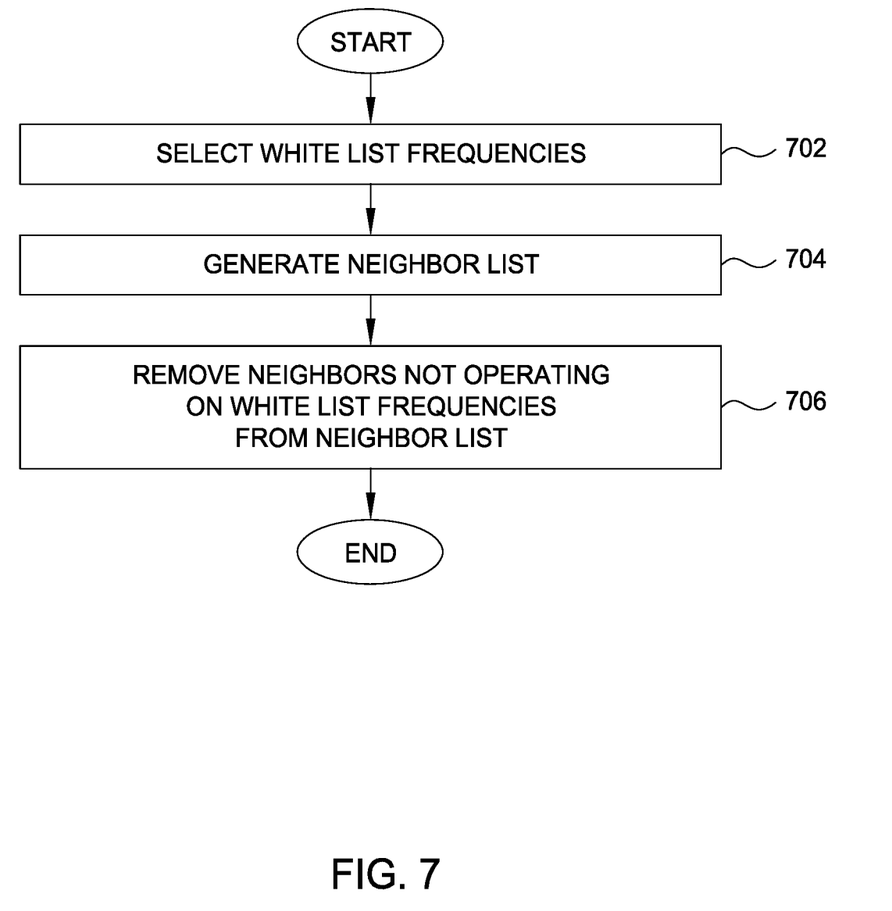
FIG. 7 is a flowchart for evaluating radio frequencies, according to an embodiment.

FIG. 7 is a flowchart for evaluating radio frequencies, according to an embodiment. This corresponds to step 604 in FIG. 6. At step 702, the network controller 101 selects the frequencies at which the candidate radio can operate as a sniffer—these are referred to as the White List Frequencies. The network controller 101 starts with a list of available frequencies, and chooses a subset of suitable frequencies based on various constraints.

The list of available frequencies can be, for example, all channels supported for operation in the country in which the candidate radio is operating. The constraints used to filter the available frequencies and create the White List can include PHY constraints. PHY constraints are hardware constraints of the selected radio that can prevent sniffer operation. For example, as discussed above with regard to FIG. 1, an AP may have two radios, a dedicated radio operating at 5 GHz and an XOR radio that can selectively operate at either 5 GHz or 2.4 GHz. In one embodiment, the dedicated radio can be used for client operation, while the XOR radio is used for sniffing. But if the wrong frequency is chosen for the sniffer, the XOR radio could interfere with the client operation of the dedicated radio. These potentially interfering frequencies can be removed from the White List. The required frequency distance between the XOR radio and the dedicated radio can be referred to as a spectrum isolation index. For example, the XOR radio may interfere if it uses a frequency that is within 100 MHz, from spectrum edge to spectrum edge, of the dedicated radio. System channel width information can be used to determine frequencies that are not suitable for sniffer operation for the candidate radio due to, for example, a spectrum isolation boundary.

In another embodiment, either the dedicated or XOR radio can be used for sniffing. Either radio, when used for sniffing, could interfere with client operation of a nearby AP (or the other radio in the same AP) if the wrong frequency is chosen. In this embodiment the network controller 101 can choose frequencies that will not interfere with neighboring APs. In both circumstances, the network controller 101 selects the frequencies that are sufficiently isolated from nearby radios, whether the nearby radio is in the same AP or in a nearby AP. These selected frequencies are the White List frequencies.

At step 704, the network controller 101 generates a list of neighbors for the candidate radio. In an embodiment, the candidate radio can be one of two radios in an AP with both a 5 GHz dedicated radio and an XOR radio, as discussed in more detail with regard to FIG. 1. If the candidate radio is operating at 2.4 GHz, the 5 GHz radio in the same AP can be used to detect neighbors. If the candidate radio is operating at 5 GHz, the candidate radio itself can be used. The network controller 101 can assume that if the 5 GHz radio in an AP is able to reach a neighbor, a 2.4 GHz radio will have the same or a higher quality signal and will also be able to reach the neighbor.

At step 706, the network controller 101 evaluates the list of neighbors generated in step 704, and determines what frequency each neighbor radio is operating on. To monitor network traffic from a neighboring radio, the sniffer radio will typically operate on the same, or a very similar, frequency channel as the target. This means the candidate radio can only monitor radios operating on a White List frequency for that candidate. Any neighbor radio operating on a frequency outside the White List frequencies is removed from the neighbor list. Further, in an AP with multiple radios, one radio in the AP can generally not be used to sniff traffic from another radio in the same AP. For example, in an AP with a 5 GHz dedicated radio and an XOR radio, the XOR radio may not be used to sniff the traffic to and from the dedicated radio. The physical proximity of the radios creates interference and other negative effects. Any neighboring radio that is located in the same AP as the candidate radio is also removed from the neighbor list. The list of remaining neighbors is then passed on to step 802 in FIG. 8.

Figure 8:
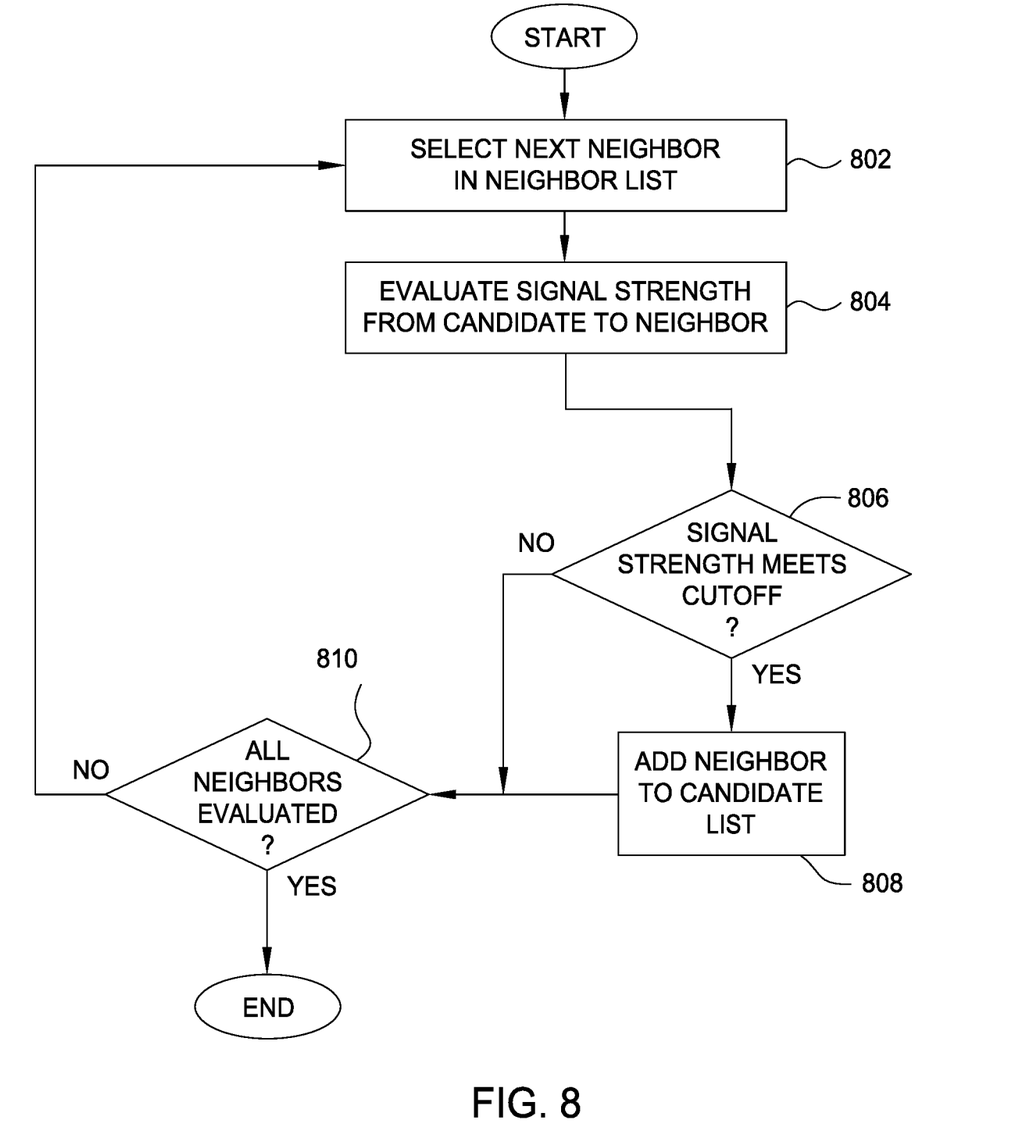
FIG. 8 is a flowchart for evaluating radio reach, according to an embodiment.

FIG. 8 is a flowchart for evaluating radio reach, according to an embodiment. At step 802, the network controller 101 selects the next neighbor radio from the list of neighbors generated in FIG. 7. At step 804, the network controller 101 evaluates the signal strength between the candidate radio and the neighbor radio. This can be measured using a received signal strength indicator (RSSI). At step 806, the RSSI is compared to a cutoff. This cutoff can be predetermined prior to system operation, can be generated by the system, or can be input by a user. If the RSSI meets the cutoff, the network controller 101 proceeds to step 808 and the candidate and neighbor are added to the Sniffer_Candidates bucket. In an embodiment, the network controller 101 can also track this RSSI and other signal strength information and store it in the Sniffer_Candidates bucket for use when selecting a sniffer. The network controller 101 then proceeds to step 810.

If the RSSI does not meet the cutoff, the network controller 101 proceeds directly from step 806 to step 810. At step 810, the network controller 101 determines whether all neighbors in the neighbor list have been evaluated. If so, the process concludes. If not, the network controller 101 returns to step 802 and selects the next neighbor in the neighbor list.

Figure 9A:
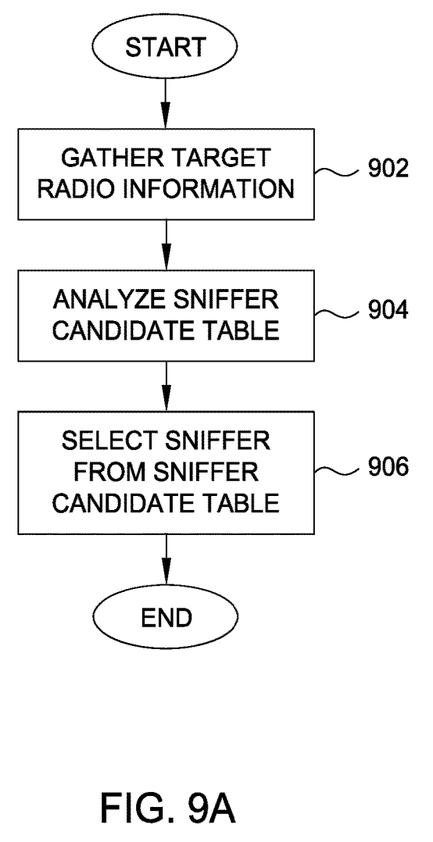
FIGS. 9A-B are flowcharts for selecting a sniffer, according to an embodiment.
Figure 9B:
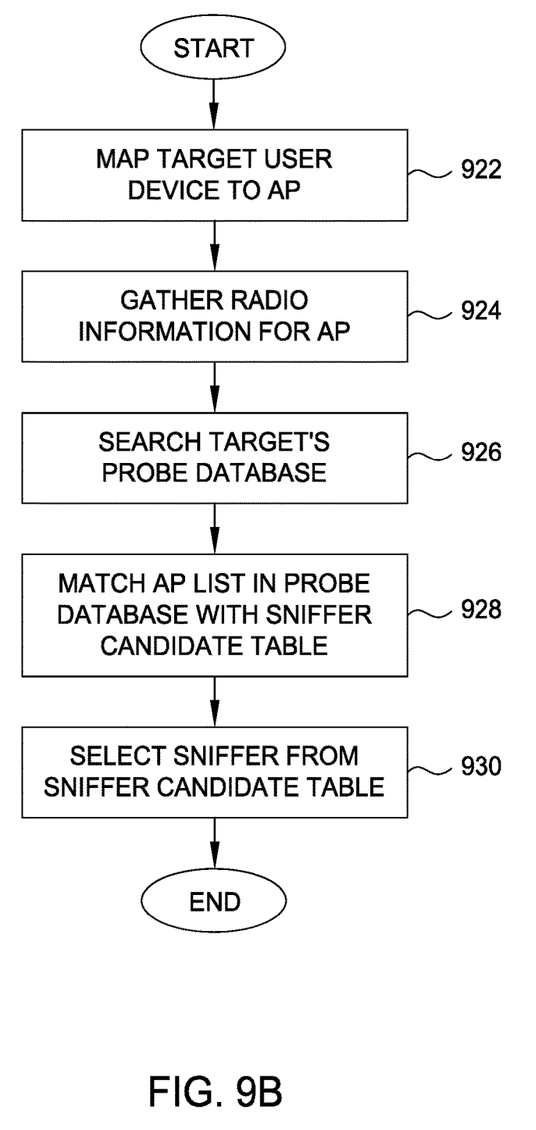

FIGS. 9A-B are flowcharts for selecting a sniffer, according to an embodiment. These correspond to step 508 in FIG. 5, discussed above. As discussed earlier, a sniffer can be used to monitor network traffic to and from a radio in a particular AP (e.g., to troubleshoot a malfunctioning radio), or a sniffer can be used to monitor traffic to and from a particular user device (e.g., to troubleshoot a user device connection). FIG. 9A is a flowchart for selecting a sniffer to monitor a radio in an AP, while FIG. 9B is a flowchart for selecting a sniffer to monitor a user device.

Starting with FIG. 9A, as discussed above this flowchart illustrates selecting a sniffer for a target radio in an AP. At step 902, the network controller 101 gathers information about the target radio to be monitored. This information can include the operating frequency and channel width for the target radio. At step 904, the network controller 101 analyzes the Sniffer_Candidates bucket to determine which radios are available to use as sniffers for the target radio. In an embodiment, the Sniffer_Candidate bucket correlates the sniffer candidates with the neighbor radios each candidate can monitor, and the signal strength. At step 906, the network controller 101 selects a sniffer from the Sniffer_Candidate bucket. This determination can be based on the proximity of the potential radio to the target, the signal strength from the potential radio to the AP to which the target is connected, and other factors. For example, the determination could also be based on additional factors related to the target and traffic to be monitored, like whether upload or download traffic is to be monitored, whether a particular type of network traffic is to be monitored, etc. In an embodiment, the network controller 101 can select the candidate with the highest signal strength to the target radio, based on the information in the Sniffer_Candidate bucket.

Turning to FIG. 9B, this flowchart illustrates selecting a sniffer for a target user device. At step 922, the network controller 101 maps the target client to the AP (and, if necessary, the radio) to which the target user device is connected. In an embodiment, the network controller 101 can maintain a table of user devices, along with the AP to which each user device is connected. The AP to which the user device is connected can be referred to as the user device's anchor AP. At step 924, the network controller 101 gathers radio information for the anchor AP. This can include the operating frequency and channel width.

At step 926, the network controller 101 searches a probe database relating to the user device. In an embodiment, the network controller 101 can maintain a database of all APs to which a given user device can connect. For example, each AP in the network can send regular updates to the network controller 101 identifying the user devices that the AP is able to cover. The network controller 101 can use these updates to maintain a probe database of which APs are able to connect to which user device(s).

The network controller 101 can use the probe database to determine which APs are potential candidates to act as a sniffer for the target client. At step 928, the network controller 101 matches these potential candidate APs from the probe database with the Sniffer_Candidate bucket. The network controller 101 analyzes the entries in the Sniffer_Candidate bucket and determines which radio, among the radios in the probe database for the target, is suitable for use as a sniffer. This determination can be based on the proximity of the potential radio to the target, the signal strength from the potential radio to the AP to which the target is connected, and other factors. For example, the determination could also be based on additional factors related to the target client and traffic to be monitored, like whether upload or download traffic is to be monitored, whether the target is a single user or a multi-user client, whether a particular type of network traffic is to be monitored, etc. At step 930, the network controller 101 selects a sniffer based on this determination.

As the user device physically moves throughout the network, the network controller 101 can change the radio used as a sniffer for the user device. For example, as discussed above with regard to FIGS. 4A and 4B, a user device 110 might initially be connected to AP3 and a radio in AP1 might act as a sniffer. The user device 110 could move, so that it is now connected to AP1. This re-association from AP3 to AP1 can trigger the network controller 101 to re-evaluate the sniffer, causing the network controller 101 to de-provision the radio in AP1 as the sniffer, and instead select a new sniffer for the user device 110. The network controller 101 could undertake the steps discussed above with regard to FIG. 8, selecting, for example, a radio in AP2 as the new sniffer and configuring the radio in AP2 to act as the new sniffer.

The network controller 101 can also re-evaluate the sniffer to be used because a target radio switches the frequency channel it is using for operation. For example, a target radio might be using a particular frequency channel for operation—e.g., channel 11. The network controller 101 could select and configure a sniffer radio to monitor traffic to and from the target on frequency channel 11. Interference in the environment (e.g., operation of a microwave oven or another interfering device) could cause the target radio to switch its frequency channel of operation—for example, from channel 11 to channel 1. The network controller 101 could detect this change in the target radio's channel of operation, and could trigger re-selection and re-configuration of the sniffer. If the new frequency channel of operation is suitable for the sniffer currently being used (e.g., the new channel is among the White List frequencies for the sniffer), the network controller 101 can configure the existing sniffer to monitor traffic on the new channel. If the new frequency channel of operation is not suitable for the current sniffer, the network controller 101 can select a new radio to use as a sniffer and configure the newly chosen sniffer to monitor traffic on the new frequency channel.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A network controller, comprising:
 a processor; and
 a memory containing a program that, when executed on the processor, performs an operation, the operation comprising:
  selecting, prior to receiving a first sniffer target, a plurality of sniffer candidate access points (APs) from among a plurality of APs, based on a first one or more properties relating to the plurality of sniffer candidate APs;
  identifying, prior to receiving the first sniffer target, a plurality of possible sniffer targets, comprising:
   identifying, for a first AP of the plurality of candidate APs, at least two sniffer targets for which the first AP can act as a network sniffer; and
   identifying, for a second AP of the plurality of candidate APs, at least two sniffer targets for which the second AP can act as a network sniffer;
  receiving the first sniffer target, wherein the identified plurality of possible sniffer targets comprises the first sniffer target;
  selecting a first third AP, from among the previously identified plurality of sniffer candidate APs, for use as a network sniffer for the first sniffer target, based on the previously identified plurality of possible sniffer targets and based on a second one or more properties relating to the third AP and the first sniffer target; and
  configuring a radio in the third AP as a network sniffer to monitor network traffic related to the first sniffer target.

2. The network controller of claim 1, the operation further comprising: identifying at least some of the sniffer candidate APs by identifying a plurality of redundant radios using Flexible Radio Assignment (FRA).

3. The network controller of claim 1, wherein identifying the plurality of possible sniffer targets for which at least one of the plurality of sniffer candidate APs can act as a network sniffer further comprises:
 determining a plurality of allowed sniffer frequencies for one or more radios in each of the sniffer candidate APs;
 identifying one or more neighbor radios for each of the sniffer candidate APs;
 selecting a first neighbor radio of the one or more neighbor radios; and
 determining that the first neighbor radio is operating on at least one of the plurality of allowed sniffer frequencies.

4. The network controller of claim 1, wherein identifying the plurality of possible sniffer targets for which at least one of the plurality of sniffer candidate APs can act as a network sniffer further comprises:
 identifying one or more neighbor radios for each of the sniffer candidate APs;
 selecting a first neighbor radio of the one or more neighbor radios;
 determining a signal strength between the sniffer candidate AP and the first neighbor radio; and comparing the signal strength to a pre-determined threshold signal strength.

5. The network controller of claim 1, wherein selecting the third AP for use as a network sniffer is further based on a signal strength between the radio in the third AP and the first sniffer target.

6. The network controller of claim 1, wherein the first sniffer target comprises a user device, the operation further comprising:
identifying a first set of one or more APs to which the user device can connect, wherein selecting the third AP is further based on the first set of one or more APs.

7. The network controller of claim 1, wherein the first sniffer target comprises a user device, the operation further comprising:
receiving notification that the first sniffer target has moved within a wireless network;
de-provisioning the radio in the third AP as a network sniffer;
identifying a first set of one or more APs to which the user device can connect after moving; and
selecting a fourth AP, of the plurality of sniffer candidate APs, for use as a network sniffer, based on the first set of one or more APs, the identified plurality of possible sniffer targets and the first sniffer target.

8. The network controller of claim 1, wherein configuring a radio in the third AP as a network sniffer further comprises providing one or more security keys related to the first sniffer target to the third AP.

9. A computer program product, comprising:
a non-transitory computer-readable storage medium having computer readable program code embodied therewith, the computer readable program code configured to perform an operation, the operation comprising:
selecting, prior to receiving a first sniffer target, a plurality of sniffer candidate access points (APs) from among a plurality of APs, based on a first one or more properties relating to the plurality of sniffer candidate APs;
identifying, prior to receiving the first sniffer target, a plurality of possible sniffer targets, comprising:
identifying, for a first AP of the plurality of candidate APs, at least two sniffer targets for which the first AP can act as a network sniffer; and
identifying, for a second AP of the plurality of candidate APs, at least two sniffer targets for which the second AP can act as a network sniffer;
receiving the first sniffer target, wherein the identified plurality of possible sniffer targets comprises the first sniffer target;
selecting a third AP, from among the previously identified plurality of sniffer candidate APs, for use as a network sniffer for the first sniffer target, based on the previously identified plurality of possible sniffer targets and based on a second one or more properties relating to the third AP and the first sniffer target; and
configuring a radio in the third AP as a network sniffer to monitor network traffic related to the first sniffer target.

10. The computer program product of claim 9, wherein the computer readable program code configured to identify the plurality of possible sniffer targets for which at least one of the plurality of sniffer candidate APs can act as a network sniffer is further configured to:
determine a plurality of allowed sniffer frequencies for one or more radios in each of the sniffer candidate APs;
identify one or more neighbor radios for each of the sniffer candidate APs;
select a first neighbor radio of the one or more neighbor radios; and
determine that the first neighbor radio is operating on at least one of the plurality of allowed sniffer frequencies.

11. The computer program product of claim 9, wherein the computer readable program code configured to identify the plurality of possible sniffer targets for which at least one of the plurality of sniffer candidate APs can act as a network sniffer is further configured to:
identify one or more neighbor radios for each of the sniffer candidate APs;
select a first neighbor radio of the one or more neighbor radios;
determine a signal strength between the sniffer candidate AP and the first neighbor radio; and
compare the signal strength to a pre-determined threshold signal strength.

12. The computer program product of claim 9, wherein selecting the third AP for use as a network sniffer is further based on a signal strength between the radio in the third AP and the first sniffer target.

13. The computer program product of claim 9, wherein the first sniffer target comprises a user device, the computer readable program code further configured to:
receive notification that the first sniffer target has moved within a wireless network;
de-provision the radio in the third AP as a network sniffer;
identify a first set of one or more APs to which the user device can connect after moving; and
select a fourth AP, of the plurality of sniffer candidate APs, for use as a network sniffer, based on the first set of one or more APs, the identified plurality of possible sniffer targets and the first sniffer target.

14. A computer implemented method for identifying and configuring an AP as a network sniffer, the method comprising:
selecting, prior to receiving a first sniffer target, a plurality of sniffer candidate access points (APs) from among a plurality of APs, based on a first one or more properties relating to the plurality of sniffer candidate APs;
identifying, prior to receiving the first sniffer target, a plurality of possible sniffer targets, comprising:
identifying, for a first AP of the plurality of candidate APs, at least two sniffer targets for which the first AP can act as a network sniffer; and
identifying, for a second AP of the plurality of candidate APs, at least two sniffer targets for which the second AP can act as a network sniffer;
receiving the first sniffer target, wherein the identified plurality of possible sniffer targets comprises the first sniffer target;
selecting a third AP, from among the previously identified plurality of sniffer candidate APs, for use as a network sniffer for the first sniffer target, based on the previously identified plurality of possible sniffer targets and based on a second one or more properties relating to the third AP and the first sniffer target; and
configuring a radio in the third AP as a network sniffer to monitor network traffic related to the first sniffer target.

15. The method of claim 14, wherein identifying the plurality of possible sniffer targets for which at least one of the plurality of sniffer candidate APs can act as a network sniffer further comprises:
determining a plurality of allowed sniffer frequencies for one or more radios in each of the sniffer candidate APs;

identifying one or more neighbor radios for each of the sniffer candidate APs;
selecting a first neighbor radio of the one or more neighbor radios; and
determining that the first neighbor radio is operating on at least one of the plurality of allowed sniffer frequencies.

16. The method of claim 14, wherein identifying the plurality of possible sniffer targets for which at least one of the plurality of sniffer candidate APs can act as a network sniffer further comprises:
   identifying one or more neighbor radios for each of the sniffer candidate APs;
   selecting a first neighbor radio of the one or more neighbor radios;
   determining a signal strength between the sniffer candidate AP and the first neighbor radio; and
   comparing the signal strength to a pre-determined threshold signal strength.

17. The method of claim 14, wherein selecting the third AP for use as a network sniffer is further based on a signal strength between the radio in the third AP and the first sniffer target.

18. The method of claim 14, wherein the first sniffer target comprises a user device, the method further comprising:
   receiving notification that the first sniffer target has moved within a wireless network;
   de-provisioning the radio in the third AP as a network sniffer;
   identifying a first set of one or more APs to which the user device can connect after moving; and
   selecting a fourth AP, of the plurality of sniffer candidate APs, for use as a network sniffer, based on the first set of one or more APs, the identified plurality of possible sniffer targets and the first sniffer target.

19. The method of claim 14, wherein configuring a radio in the third AP as a network sniffer further comprises providing one or more security keys related to the first sniffer target to the third AP.

20. The network controller of claim 1,
   wherein the first one or more properties comprises at least one of: (i) a client load for a respective AP, (ii) neighbor radio coverage for the respective AP, or (iii) a redundant radio for the respective AP, and
   wherein the second one or more properties comprises at least one of (i) an operating frequency relating to the first sniffer target, (ii) a channel width relating to the first sniffer target, (iii) a proximity of the third AP to the first sniffer target, (iv) a signal strength related to the third AP and the first sniffer target, or (v) a property relating to traffic to be monitored by the third AP.

* * * * *

UNITED STATES PATENT AND TRADEMARK OFFICE
CERTIFICATE OF CORRECTION

PATENT NO. : 10,700,956 B2
APPLICATION NO. : 15/875902
DATED : June 30, 2020
INVENTOR(S) : Jie Jiang et al.

It is certified that error appears in the above-identified patent and that said Letters Patent is hereby corrected as shown below:

On the Title Page

In Column 2, in "Primary Examiner", Line 1, delete "S M A Rahman" and insert -- SM A Rahman --.

In the Claims

In Column 14, Line 32, in Claim 1, after "a" delete "first".

Signed and Sealed this
Third Day of January, 2023

Katherine Kelly Vidal
*Director of the United States Patent and Trademark Office*